United States Patent [19]

Bachman

[11] Patent Number: 4,631,664

[45] Date of Patent: Dec. 23, 1986

[54] PARTNERSHIP DATA BASE MANAGEMENT SYSTEM AND METHOD

[75] Inventor: Charles W. Bachman, Lexington, Mass.

[73] Assignee: Bachman Information Systems, Inc., Cambridge, Mass.

[21] Appl. No.: 515,290

[22] Filed: Jul. 19, 1983

[51] Int. Cl.⁴ .................................................. G06E 7/00
[52] U.S. Cl. .................................... 364/200; 364/300
[58] Field of Search ... 364/200 MS File, 900 MS File, 364/300

[56] References Cited

U.S. PATENT DOCUMENTS

| 4,468,728 | 8/1984 | Wang | 364/200 |
| 4,468,732 | 8/1984 | Raver | 364/200 |
| 4,479,196 | 10/1984 | Ferrer et al. | 364/900 |

OTHER PUBLICATIONS

"The Partnership Data Model" by Charles W. Bachman published on 2/83.
"Data Base Organization" Second Edition, by James Martin Chapters 6 and 15, published by Prentice-Hall, Inc. 1977.
"The Structuring Capabilities of the Molecular Data Model", Charles W. Bachman, Jun. 6, 1983, *Entity-Relationship Approach to Software Engineering*, Elsevier Science Publishers B.V., 1983, pp. 55–68.
"The Structuring Capabilities of the Molecular Data Model", Charles W. Bachman, Jun. 6, 1983, revised Jul. 25, 1983.

*Primary Examiner*—James D. Thomas
*Assistant Examiner*—Thomas C. Lee
*Attorney, Agent, or Firm*—Lahive & Cockfield

[57] ABSTRACT

A data base management system according to the invention stores, retrieves, and modifies data records within a digital computer data base, permitting access to related data records through partnerships joining record pairs. Partnership sets are employed to relate data records on a one-to-one, one-to-many, and a many-to-many basis. The invention facilitates the modelling of real world structures and events in a data base whose logical representation closely depicts those structures and events.

10 Claims, 4 Drawing Figures

PARTNERSHIP DATA BASE MANAGEMENT SYSTEM AND METHOD

BACKGROUND OF THE INVENTION

The present invention is in the field of data processing, and more particularly relates to data base management systems.

Early computer information processing systems stored, retrieved, and modified data contained in files specifically created for each information processing application. Knowledge relating to the structure and content of each data file was coded directly into each application program. When a need later developed to use the data within the data file for additional purposes, the user often created other primarily-redundant data files, writing a specific application programs to interact with each of these files. Subsequent changes in the content of any data file frequently mandated modification of the related datafiles. If the user wished to avoid creating redundant datafiles, those modifications necessitated by additional demands were made to the original data file. Again, application programs were written to perform new tasks on the modified file. However, the data file modifications sometimes hampered operation of earlier application programs, thus requiring their modification. In consequence, computer installations involved in data processing faced the recurrent task of choosing between data file redundancy and repeated software modifications.

Flaws in the early information processing systems were readily apparent. In addition to the problems discussed above, further difficulties arose regarding efficient data file design and the need for adequate systems documentation. While a data file may have been designed for efficiency in the original application, subsequent applications programs often wastefully retained the original design. Moreover, efficient design was often lacking even in the original data file, as the structure evolved haphazardly during the coding of the original application program.

In addition to design faults, the early information processing systems did not lend themselves to the production of adequate system documentation. Such documentation, which is a necessary aid for subsequent modifications of both the data files and application programs, was written as an afterthought upon completion of the application program. In many instances, the only documentation aviable was the application program itself.

With the advent of the data base management system, many of the problems encountered in the early information processing systems were alleviated. In addition to removing the need of the application program to address the intricacies of the data file manipulation, the data base management systems promoted efficient design, enhanced file maintenance and modification, eliminated data file redundancy, and provided substantial documentation regarding data file structure.

With the shift to data base management systems, the concept of dual data representation fully emerged. The first level of the data representation, the physical representation, relates to the manner in which individual data records are stored and how their inter-relationships are depicted. The second level of data representation, the logical representation, describes the data base users' view of the data. The physical representation of the data is generally of no concern to the data base user. Rather, the task of manipulating individual data storage areas is left to the data base management system. Of concern to the data base user, however, is the logical representation of the data, as the users' ability to store, retrieve, and modify aggregations of data items, data records, and data relationships is dependent upon the form in which the data base management system presents data to the user.

The principal prior art data base management systems are the Network data base management systems, Hierarchical data base management systems, and Relational data base management systems. Each of these systems allows storage, accessing, and modification of data items and records within a data base; however the systems are based on substantially different logical representations of data relationships. In Relational data base management systems, particular real world relationships are not generally represented on more than a transitory basis within the data base, as those relationships can be recreated on an ad hoc basis by the application program. In contrast, the Network and Hierarchical data base management systems permit and encourage the construction of inter-record associations which closely represent the relationships which exist between entities in the real world.

The Network data model, the basis of the Network data base system, served as the basis for the Conference on Data Description Languages (CODASYL) development of an industry wide standard for data base systems. The principal data relationship of the CODASYL standard is the owner/member set, which relates groups of data records. Each set consists of an owner record and zero, one or more member records. The CODASYL specifications do not permit a record to participate as both the owner and the member of a particular set. However, a record type may participate as an owner or a member of many different sets. A complex data base, one used in modeling a number of intricate real world relationships, is composed of many of these owner/member sets.

The Hierarchical data base management systems employ a tree structure to relate groups of records. These hierarchical associated groupings roughly correspond to the owner/member sets of the Network data base managment systems. While a record may participate as the owner of any number of owner/member sets, the Hierarchical data model does not permit a record to participate as a member of more than one set.

The Relational data base systems do not explicitly support relationships between data records. Instead, these systems provide a JOIN operation to create new records (n-tuples) from pairs of existing records. Each application program utilizes the JOIN command to reconstruct inter-record associations through selection criterion based on specific record items, or keys. The JOIN operation, creating these ad hoc connections between pair of records, is the counterpart of the associations explicitly declared and created in the Network and Hierarchical data base management systems.

A fundamental difficulty with prior art Network, Hierarchical and Relational data base management systems is their inability to adequately represent the full range of relationships which exist between objects in the real world. The Network data base management system is limited in that the Network model cannot directly represent either one-to-one or many-to-many relationships. Further, the owner/member set concept does not allow one record type to participate as both the owner and the member of the same set. In the prior art, users must overcome these limitations by defining and creating additional record types and owner/member set types, which serve only a bridging purpose.

The Relational data base management system is further limited in that it cannot provide disjunctive and conjunctive association. Furthermore, not all forms of many-to-many relationships can be represented.

Accordingly, it is an object of the present invention to provide an improved data base management system.

It is another object to provide a data base management system which utilizes data base logical representations corresponding substantially to real world relationships.

It is yet another object to provide a data base management system which supports one-to-one, one-to-many, and many-to-many associations.

SUMMARY OF THE INVENTION

Briefly, the data base management system of the present invention, referred to below as the Partnership data base management system, controls the storage, retrieval and modification of information in a data collection contained in storage devices in a data processing system. In this system, the data collection includes a plurality of data records, each data record including zero, one or more items, where an item is representative of zero, one or more data values. In one form of the invention, the system includes a programmed data computer adapted to establish one or more partnership sets within at least one data record, where each partnership set is representative of zero, one or more partnerships. The computer is further adapted to establish one or more partnerships, wherein each partnership is characterized by one partnership set associated with itself or associated with one other partnership set. The computer controls access to one or more data records by reference to a partnership set which is in partnership with partnership sets of one or more data records.

The Partnership data base management system incorporates two principal features: first, the concept of the partnership, joining pairs of records, and second, the partnership set, attaching a number of related partnerships to a record. In practice, the composition of these partnership sets is controlled through declarations defining the number of partnerships, the types of partnerships, and the mixture of partnership types which may exist in the partnership set at any moment in time.

The internal structures of the Partnership data model for the Partnership data base management system are records, items, values, partnerships, and partnership sets. A record is a structure representing the existence of a real world entity. The records of the Partnership data model correspond to the records of the Network model, the segments of the Hierarchical model, and the n-tuples of the Relational model. The Partnership data base systems records are the basic objects of storage, retrieval, and modification of the data base. Records have record identifiers which distinguish one record from another.

An item is a structure within a record which holds a value representing a quantifiable property of the real world entity whose existence is represented by the data record. Item values are logically drawn from the value space of a dimension and are physically represented according to the rules of data representation. The Partnership data model's items correspond generally to items in the Network data model and the values of the Relationship data model. Items have item names by which the item value may be referenced relative to a particular record.

The value is a structure which represents an element within a value space applicable to the measurement of one real world entity in comparison with itself and other real world entities. It is associated with one or more item structures that apply the measure to specific records. Values do not have names and are only indirectly referenced through the items to which they are attached, or through the value space they occupy.

The partnership is a structure which establishes a logical relation between two records. It represents the relationship between entities in the real world. A partnership provides the main substance through which access to either one of the two records assures access to the other record. Partnerships do not have names and are only indirectly referenced through the partnership sets to which they are attached.

A partnership set is a structure associated with a record. The set provides means by which one or more partnerships may be logically attached to a record. A record may contain zero, one, or more partnership sets, each partnership set having a name which is unique within the context of the record. The partnership set name is used in referencing the partnerships binding associated records.

The Partnership data model internal structures described above may be combined in various ways to build data structures. The following rules specify the manner in which these combinations are be formed:

A. A data collection may contain any number of distinctly identified records;

B. A record may contain any number of distinctly identified items, each item representing zero, one or more data values;

C. A value may be referenced by one or more items;

D. A record may contain any number of distinctly identified partnership sets;

E. A partnership set may participate in a partnership relation with itself or any other partnership set;

F. A partnership, is a non-directed relationship between a pair of partnership sets.

The Partnership data model, as described above, presents the mechanism for the creation of the many-to-many relationship. Both one-to-many and one-to-one associations result from the application of constraints to the many-to-many relationship capacity. A first constraint allows fixing the minimum and maximum number of partnerships which may be attached to a partnership set, independent of the partnership type involved. A second constraint permits the use of Boolean logic in specifying the number of partnerships of various types which may be attached to a partnership set. A third constraint limits the number of partnerships which may join any two partnership sets. Finally, constraints may be established on data values used in data records.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Computer-based information systems, which are used to support the operation of various commercial, financial, and service institutions, are constructed of many logical and physical elements. Many of these elements are "specific" to the institution using the system, while others are "generic" to the problem of information processing.

The institution specific elements have been identified as "application processes." These application processes may be of different physical characteristics, i.e., some may be people working at their assigned tasks, some may be application programs executing in a computer, while others may be physical processes in a factory, power plant, or in a hospital. The distinguishing characteristics of these application processes is that they all carry out the three following types of work on behalf of their institution:

(1) Exchange information with other application processes;

(2) Store (and retrieve) information for future reference; and (3) Make decisions based on the information available to them and the rules of their particular application process.

The generic elements have been identified as "system processes." These system processes, which support the operation of the application processes, can be divided into four classes. These classes are based upon the types of action they support:

(1) Interprocess communication;

(2) Data storage and retrieval;

(3) Process and computer resource management; and (4) Application program development and maintenance.

Figure 1:
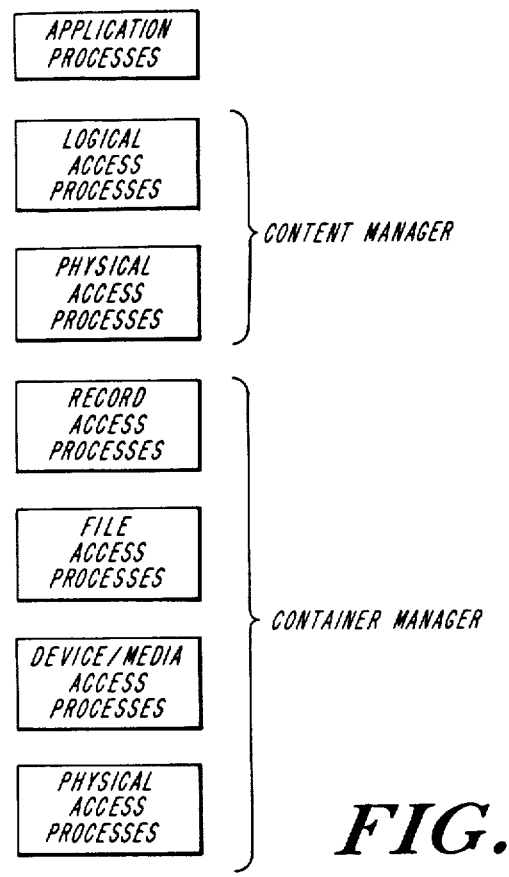
FIG. 1 illustrates a hierarchy of process types for a data storage and retrieval system.

FIG. 1 illustrates a hierarchy of process types for supporting data storage and retrieval. These process types are divided into two sub-classes called content management and container management. Content management establishes the organization and indexing of the information to be stored. Container management establishes the operation and control of the storage devices and media where the information is to be stored.

The application processes are shown at the top of FIG. 1 and the physical access processes are shown at the bottom. The intermediate five levels of system processes assist in the transformation of the requests of the application processes into physical recording media actions. "Service access points" exist between each of the levels of processes in the data storage and retrieval hierarchy where a set of service requests and responses may be exchanged. These requests and responses relate to a set of objects which may be manipulated. Table 1 lists the requesting and responding levels and their "objects of discourse."

TABLE 1

| REQUESTOR LEVEL | RESPONDER LEVEL | OBJECTS OF DISCLOSURE |
|---|---|---|
| Application Processes | Logical Access Processes | Logical Record, Items, Relationships |
| Logical Access Processes | Physical Access Processes | Physical Records, Items Relationships |
| Physical Access Processes | Record Access Processes | Record Space |
| Record Access Processes | File Access Processes | Files, Pages, Buffers |
| File Access Processes | Device/Media Access Processes | Devices, Volumes, Cylinders Tracks, Segments |
| Device/Media Access Processes | Physical Access Processes | Bit Streams |
| Physical Access Processes | Physical Media | Electromagnetic Signals |

The present invention is used at the Logical and Physical Access levels in the data storage and retrieval process hierarchy. It provides the application process level with capability to operate on record relationships beyond the capability of existing systems.

One embodiment of the invention utilizes two classes of commands to define and control the data base elements. The Data Description Language (DDL) primitives are used in defining records, items, partnership sets and partnerships. The Data Manipulation Language (DML) primitives allow run-time control of the data base. Both the Data Description Language and Data Manipulation Language are used in conjunction with record and item objects in a conventional manner.

Among the commands constituting the Data Description Language are DECLARE-SET and DECLARE-PARTNERSHIP. The DECLARE-SET command defines a partnership set type within a record type, permitting declaration of constraints on the number and type of partnerships which may attached to an occurrence of the set type at any time. Command parameters include the name of the set being declared, the name of the record type with which the set is associated, the partnership expression governing the attachment of partnerships to the set and any constraints on the number of partnerships independent of partnership type. The partnership expression may be arbitrarily complex, including "AND" operators, "OR" operators and parenthesis (to combine DECLARE-PARTNERSHIP commands).

In order to name the set and record types constituting the other end of the partnership relation, the DECLARE-PARTNERSHIP command is used in conjunction with the DECLARE-SET command. As a result of the combined utilization of these commands, the resultant partnership type is defined to end in a pair of partnership set types. The partnership type has no explicit name or other attribute. The DECLARE-PARTNERSHIP parameters describe the set and record type constituting the far end of the partnership relation, and they delineate the minimum and maximum number of partnerships the partnership type may form with the associated partnership sets.

Four Data Manipulation Language commands are associated with the embodiment of the partnership data base management system, these include the CON- NECT, DISCONNECT, FIND-PARTNER, and FIND-PARTNERS commands. The CONNECT operation creates a partnership occurence between two partnership set occurences. The four parameters which must be furnished in order to create the partnership embrace the identifiers of the records and set types constituting the end points of the partnership. An addiional parameter specifies the ordering of the partnerships within the partnership sets. This ordering may take any of the forms of the ordering rules used in the Network data base management system.

The DISCONNECT operation severs existing partnerships. The four basic command parameters identify the partnerships end points. Where multiple partnerships exist between the same pair of sets, an additional parameter identifies which of several partnerships to sever.

The FIND-PARTNER operation accesses a single record bound to the subject record at the subject partnership set. Where several partnerships are attached to the set, the ordering rules, specified during partnership creation, are employed to determine which particular record to access. Four parameters are utilized by the FIND-PARTNER in locating and processing the associated record. The first two parameters specify the subject record and subject partnership. The third parameter identifies the "partner-found" procedure, executed upon finding the paired record. If the subject partnership set is empty, the "empty-set" procedure, specified in the fourth parameter, is executed. The third and fourth parameters may be null, indicating that no action is required.

The "partner-found" procedure and the "empty-set" procedure are defined by the user. They may include data manipulation statements and other procedure calls. The user furnished "partner found" procedure must be defined with two parameters. The first parameter will pass the identifier of the partner record accessed. The second will pass the name of the partnership set of the partner record through which it was accessed. The FIND-PARTNER operation is logically similar to the IF-THEN-ELSE programming language construct. The interpretation of the operation is "IF the designated partnership set is not empty THEN do ... ELSE do ....

The FIND-PARTNERS operation is an extended form of the FIND-PARTNER operation, used to access all object records joined by partnerships to the subject record partnership set. The object records are accessed sequentially in accordance with the ordering rules specified upon partnership creation. The FIND-PARTNERS operation employs six parameters. The first two specify the subject record and subject partnerhsip set. A third parameter identifies the "beginning-of-set" procedure which is executed if any partnerships are found within the subject set.

The fourth parameter identifies the "each-partner" procedure which is executed once for each partnership found in the partnership set. The "each-partner" procedure is user-furnished and must be furnished with three parameters of its own. The first parameter will pass the identification of the partner record accessed. The second will pass the name of the partnership set of the partner record through which it was accessed. The third parameter is a continuation parameter by which the "each-partner" procedure may indicate to the FIND-PARTNER operation whether retrieval of additional partners is desired. The fifth parameter identifies the "end-of-set" procedure, which is executed after all partnerships have been processed. Finally, the sixth parameter specifies the "empty-set" procedure, which is executed if no partnerships exist within the partnership set. As in the FIND-PARTNER operation, parameters three through six are user-specified, and they may be null, indicating that no action is required.

The following section defines the syntax by which partnership set types and partnership types are declared. The syntax is defined in terms of the Backus-Naur Form, and is included within the larger syntax necessary to define records, items, and other data representations.

SET DESCRIPTION SYNTAX:

```
<set-description> ::= SET <set-name> <primary-expression>
          <minimum-expression> <maximum-expression>
          <partnership-expression>

<set-name> ::= <identifier>

<primary-expression> ::= <null>  |  PRIMARY

<minimum-expression> ::= <null>  |  MINIMUM <integer>

<maximum-expression> ::= <null>  |  MAXIMUM <integer>

<partnership-expression> ::= <partnership-element> |
          <partnership-element> <partnership-operator>
          <partnership-expression>

<partnership-element> ::= ( <partnership-expression> ) |
          PARTNERSHIP <mapping-expression> WITH
          <set-name> OF <record-name>
          <partnership-derivation>
```

```
<partnership-operator>  ::=  AND | OR

<mapping-expression>  ::=  <map-element> TO <map-element>

<map-element>  ::=  ONE | MANY | ( <interval-expression> )

<interval-expression>  ::=  <integer> <interval-separator> <integer>

<interval-separator>  ::=  , | -

<partnership-derivation>  ::=  <null> | DERIVED <path-list>

<path-list>  ::=  <path> | <path>, <path-list>

<path>  ::=  VIA <set-name> SET TO <set-name> SET OF <record-name>
```

Figure 1A:
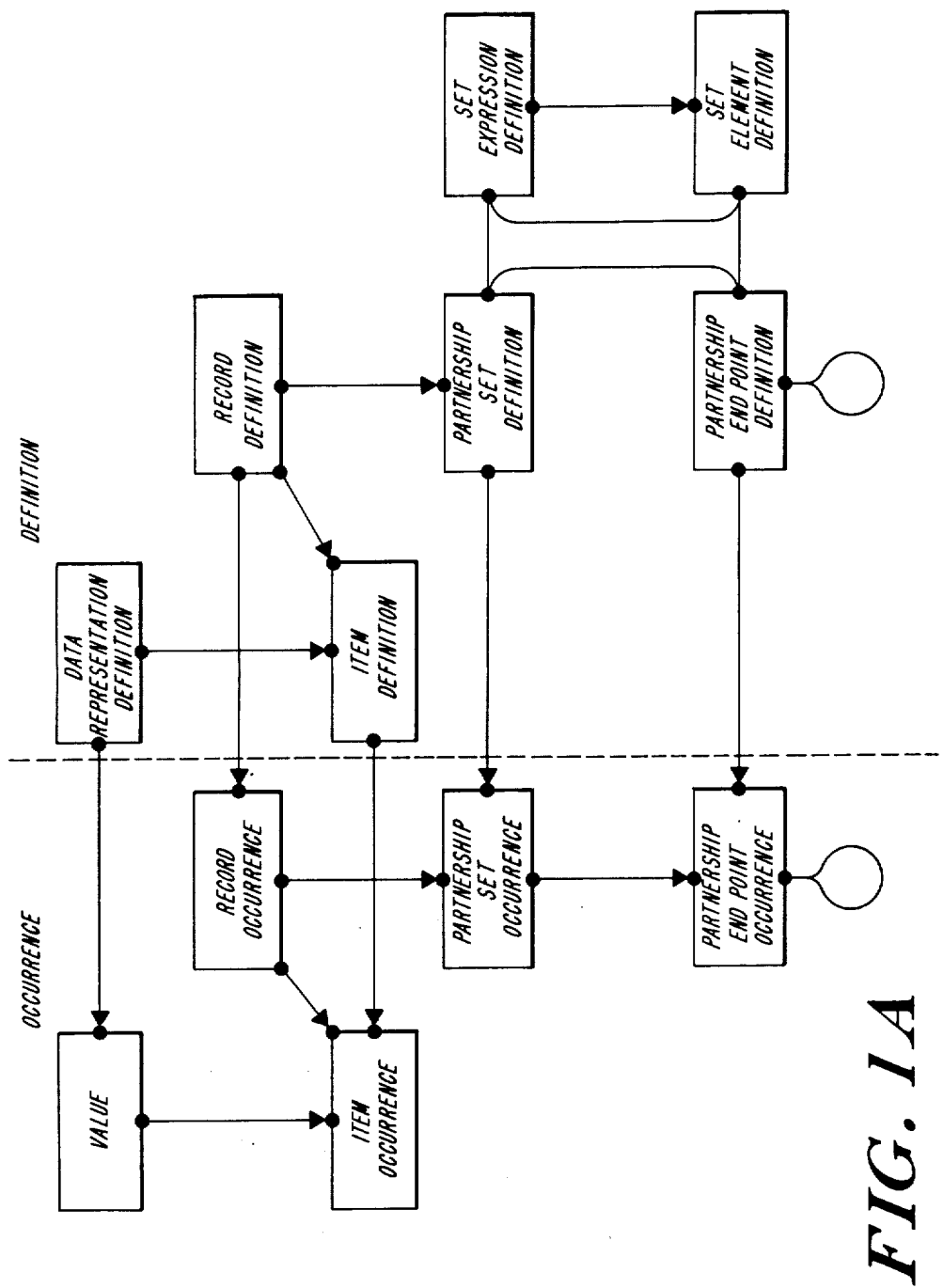
FIG. 1A illustrates the internal structure for occurrence and definition information according to one aspect of the invention.

FIG. 1A shows the internal structure for occurrence and definition information consistent with the above syntax, and the rules of the Partnership data model set forth above.

Figure 1B:
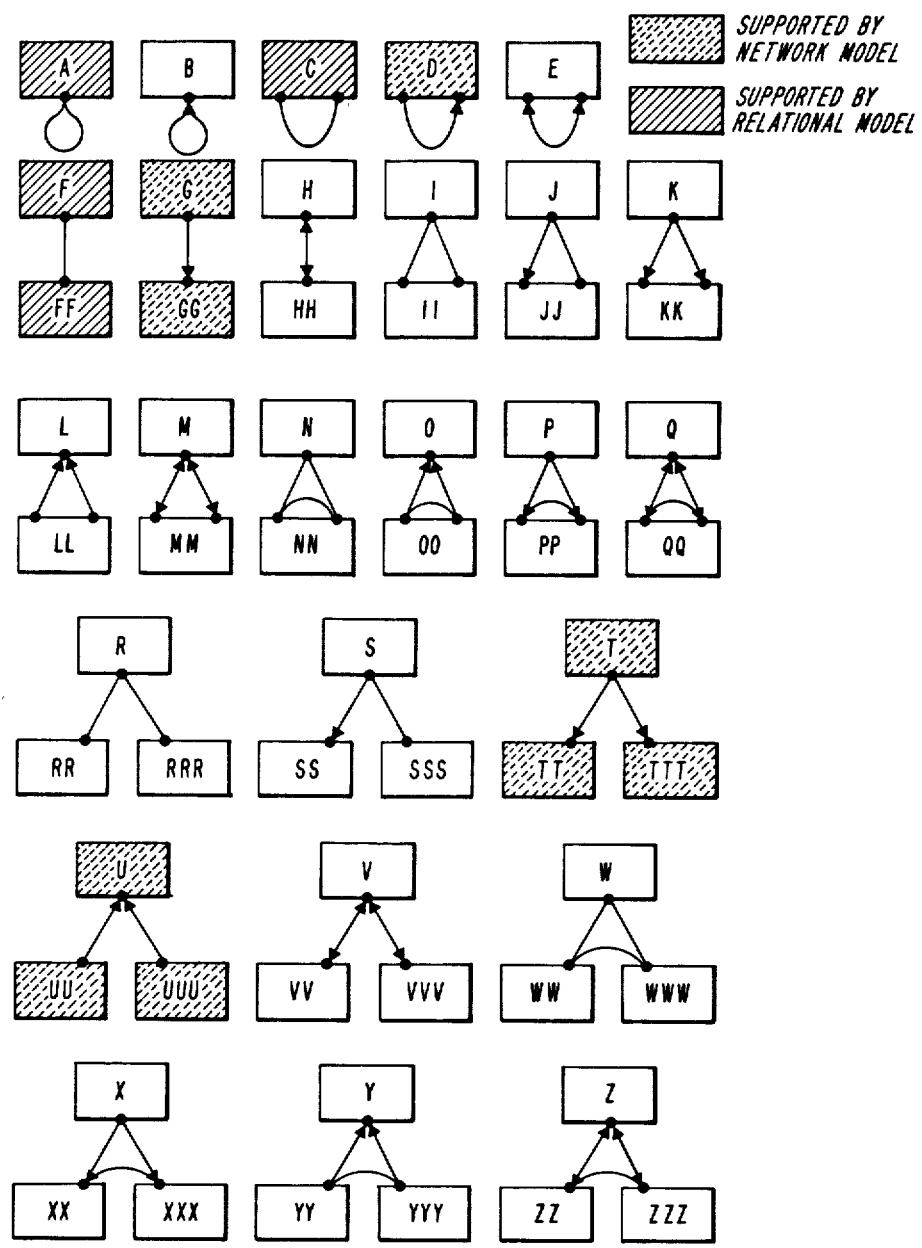
FIG. 1B illustrates the variety of record interrelationships supported by the invention.

FIG. 1B illustrates all the ways that one, two, or three records can be related with each other by a single relationship as a conjunctive (disjunctive) set of relationships. All of these are supported by the Partnership data base system. Only these dashed and dotted cases can be supported by prior art Relational and Network data models.

Figure 2:
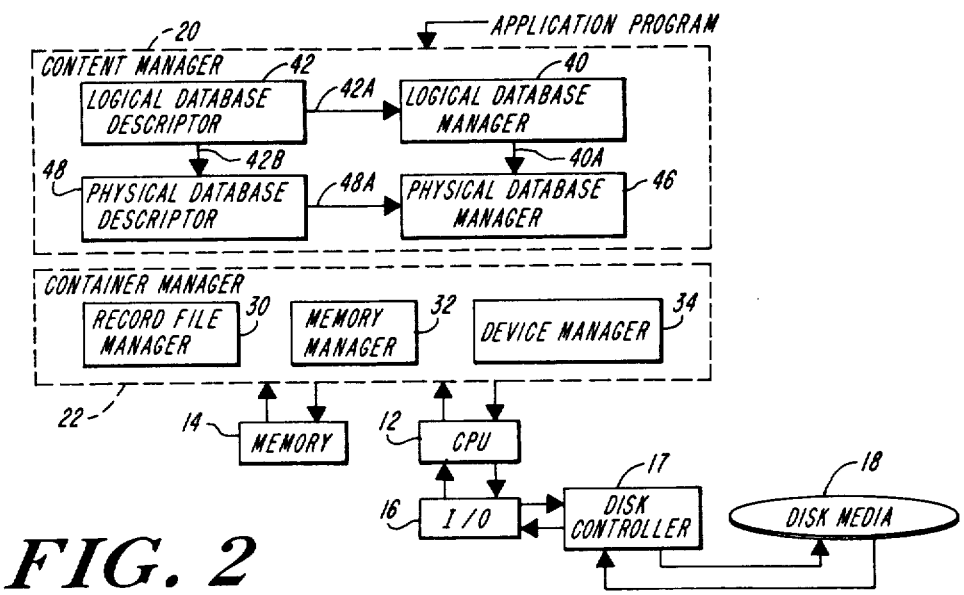
FIG. 2 shows in block diagram form an exemplary embodiment of the present invention.

FIG. 2 shows in block diagram form a Partnership Data Base Management System 10 in accordance with the present invention. In the illustrated configuration, the system is embodied in a programmed digital computer. More specifically, the computer utilized is an IBM 3033 computer, with an associated IBM 3350 disk storage unit, incorporating the IBM OS MVS SP 1.3 operating system.

The system 10 shown in FIG. 2 includes a central processing unit 12, a memory system 14, an input and output (I/O) interface unit 16, a disk controller unit 17, and a disc media unit 18. The system 10 further includes a content manager 20 and a container manager 22.

The content manager includes a logical data base manager 40, an associated logical data base descriptor 42, a physical data base manager 46, and an associated physical data base descriptor 48.

The container manager 22 is configured in a conventional manner for data base management systems, and includes a record file manager 30, memory manager 32, and device manager 34. In this embodiment, the container manager 22 is established by software resident in the memory of the IBM 3033 computer. That software is in the form of the IDMS-DB software module of the Integrated Data Management System—Data Base manufactured by Cullinet Software, Inc., Westwood, Mass., together with the Basic Direct Access Method module software manufactured by IBM. In the present embodiment, the logical data base manager 40, logical data base descriptor 42, the physical data base manager 46, and physical data base descriptor 48 is established by software resident in the memory of the IBM 3033. Those elements are embodied by the software in the attached Appendix I together with the IDMS-DB software modules.

Generally, the logical data base descriptor 42 provides a logical data base description and produces signals on line 42a representative of logical objects for the data base. The physical data base descriptor 48 converts the logical record descriptors to physical record descriptors and provides signals on line 48a representative of the physical records. The logical record descriptors are represented by signals on line 42b.

The application program is supplied by the user and provides commands for storage of records, deletion of records, access and modification of items, connection of records, and retrieval of records. In effect, the logical data base manager 40 converts the command signals from the application program to (or translates) the signals required by the physical data base manager 46 in keeping with the requirements of the IDMS-DB software.

In the present embodiment, the application program is coupled to the data base manager, through the separate logical data base manager 40 and physical data base manager 46 modules. Alternatively, the logical data base manager 40 may be configured to perform full translation of the signals received from the application program and to apply those translated signals directly to the container manager 22.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX I

```
OPRTNR:  PROCEDURE(SET_NAME, PPROC,
   NOPPROC) RECURSIVE;

/* This procedure implements the pair relationship function of
obtaining the partner of the current record of the program via
the designated set.  The partner, if it exists, will be either
``` the owner of the set or the "first" member of the set. If a
partner exist, then the procedure whose name has been passed
using the parameter designated as "PPROC" will be
executed. When that procedure is called, the partner will be
the current record of the program. When control is returned to
the statement following the invocation of the "OPRTNR"
procedure, the current record of the program will be
reestablished as it was when the procedure was envoked. If no
partner exists, then the procedure whose name was passed with
the parameter designated by "NOPPROC" will be
executed. Both procedural parameters must be present. If there
is an error situation, the standard IDMS error message will be
returned via the ERROR_STATUS field. */

```
DCL PPROC ENTRY;
DCL NOPPROC ENTRY;
DCL (SET_NAME, SET_NAME2) CHAR(16);
DCL (PRIOR_REF, CURRENT_REF, OWNER_REF) FIXED BINARY(31);
DCL OBTAIN_INDICATOR BIT(1);

/* Set indicator for OBTAIN entrance. */

OBTAIN_INDICATOR = '1'B;
GO TO START2;

FPRTNR:  ENTRY(SET_NAME, PPROC,
     NOPPROC);
OBTAIN_INDICATOR = '0'B;

START2:
SET_NAME2 = TRANSLATE(SET_NAME, '-', '_');

/* Determine whether there is a current record of the program. */

IF DBKEY = - 1
THEN DO;
     ERROR_STATUS = '2113';
     ERROR_RECORD = RECORD_NAME;
     ERROR_SET = SET_NAME;
     RETURN;
     END;
ELSE;

/* Determine whether current record of set is also the current
   record of program. */

/* ACCEPT CURRENCY SET (SET_NAME2) INTO (CURRENT_REF) */
CALL IDMS(SUBSCHEMA_CTRL, IDBMSCOM(57), SET_NAME2, CURRENT_REF);
CALL IDMS_STATUS;
IF CURRENT_REF ¬= DBKEY
THEN DO;
     ERROR_STATUS = '2135';
     ERROR_RECORD = RECORD_NAME;
     ERROR_SET = SET_NAME;
     RETURN;
     END;
ELSE;

/* Determine whether subject record is an owner or a member of the
   designated set type. */

/* ACCEPT CURRENCY SET (SET_NAME2) OWNER INTO (OWNER_REF) */
CALL IDMS(SUBSCHEMA_CTRL, IDBMSCOM(70), SET_NAME2, OWNER_REF);
```

```
CALL IDMS_STATUS;
IF OWNER_REF ¬= DBKEY
THEN DO;

/*  Current record is not the owner of the designated set.  */

IF OBTAIN_INDICATOR
    /*  FIND/OBTAIN OWNER SET (SET_NAME2)  */
    THEN CALL IDMS(SUBSCHEMA_CTRL, IDBMSCOM(31), SET_NAME2,
        IDBMSCOM(43));
    ELSE CALL IDMS(SUBSCHEMA_CTRL, IDBMSCOM(31), SET_NAME2);
    IF ERROR_STATUS = '0000'
    THEN DO;
        CALL PPROC;

/*  Restore currency of the subject record.  */

/*  FIND DBKEY (CURRENT_REF)  */
        CALL IDMS(SUBSCHEMA_CTRL, IDBMSCOM(75), CURRENT_REF);
        END;

/*  Determine if subject record is member but not connected.  */

ELSE IF ERROR_STATUS = '0322'
        THEN DO;
            ERROR_STATUS = '0000';
            CALL NOPPROC;
            END;
        ELSE DO;
            END;
    RETURN;
    END;
ELSE;

/*  Subject record is the owner of the set.  */

/*  FIND/OBTAIN FIRST RECORD SET (SET_NAME2)  */
        THEN DO;
IF OBTAIN_INDICATOR
THEN CALL IDMS(SUBSCHEMA_CTRL, IDBMSCOM(20), SET_NAME2,
    IDBMSCOM(43));
ELSE CALL IDMS(SUBSCHEMA_CTRL, IDBMSCOM(20), SET_NAME2);
IF ERROR_STATUS = '0000'
THEN DO;
    CALL PPROC;

/*  Restore subject record as current record of program.  */
    /*  FIND DBKEY (CURRENT_REF)  */
    CALL IDMS(SUBSCHEMA_CTRL, IDBMSCOM(75), CURRENT_REF);
    CALL IDMS_STATUS;
    END;

/*  determine if set was empty  */

ELSE IF ERROR_STATUS = '0307'
    THEN DO;
        ERROR_STATUS = '0000';
        CALL NOPPROC;
        END;
    ELSE DO;
        CALL IDMS_STATUS;
        END;

END OPRTNR;
```

```
OPRTNRS:  PROCEDURE(SET_NAME, FPROC,
                   PFUNCT, LPROC,
                   NOPPROC) RECURSIVE;

/* This procedure implements the pair relationship function of
obtaining the partner(s) of the current record of the program
via the designated set.  It is immaterial as to whether the
current record of the program is either the owner or the member.
If there is no partner, i.e., the current record is not
connected as a member or the current record is the owner of an
empty set, then the "NOPPROC" will be called.  If
there is an owner-record or at least one member, the
"PFUNCT" will be called, but only after the
"FPROC" has been called.  The "PFUNCT will
be called once for each partner retrievable until all have been
retrieved, or until the PFUNCT returns a false value.
When the PFUNCT is called, the partner
record will be the current record of the program and current
record of the set.  After all partners have been accessed, the
"LPROC" will be called.  When the "NO_PARTNER", and
"END" procedures are called, the initial current record of
program will be the current record of program. When the "BEGIN"
and "PARTNER" procedures are called the partner record is the
current record of program. */

DCL PFUNCT ENTRY RETURNS(BIT(1));
DCL (FPROC, LPROC, NOPPROC) ENTRY;
DCL (SET_NAME, SET_NAME2) CHAR(16);
DCL (PRIOR_REF, CURRENT_REF) FIXED BINARY(31);
DCL OBTAIN_INDICATOR BIT(1);
DCL CONTINUE BIT(1) INIT ('1'B);
DCL OWNER_REF FIXED BINARY(31);

/* Set indicator for OBTAIN entrance. */
OBTAIN_INDICATOR = '1'B;
GO TO START1;

FPRTNRS:  ENTRY(SET_NAME, FPROC, PFUNCT,
          LPROC, NOPPROC);
OBTAIN_INDICATOR = '0'B;

START1:
SET_NAME2 = TRANSLATE(SET_NAME, '-', '_');

/* determine whether there is a current record of the program */

IF DBKEY = -1
THEN DO;
    ERROR_STATUS = '2013';
    ERROR_RECORD = RECORD_NAME;
    ERROR_SET = SET_NAME;
    RETURN;
    END;
ELSE;

/* determine whether the current record of program is the
current record of the subject set */

/* ACCEPT CURRENCY SET (SET_NAME2) INTO (CURRENT_REF) */
CALL IDMS(SUBSCHEMA_CTRL, IDBMSCOM(57), SET_NAME2, CURRENT_REF);
CALL IDMS_STATUS;
IF CURRENT_REF ¬= DBKEY
THEN DO;
    ERROR_STATUS = '2035';
```

```
      ERROR_RECORD = RECORD_NAME;
      ERROR_SET = SET_NAME;
      RETURN;
      END;
ELSE;

/*  Determine whether subject record is an owner or a member of
the designated set. */

/*  ACCEPT CURRENCY SET (SET_NAME2) OWNER INTO (OWNER_REF)  */
CALL IDMS(SUBSCHEMA_CTRL, IDBMSCOM(70), SET_NAME2, OWNER_REF);
CALL IDMS_STATUS;
IF OWNER_REF = DBKEY
THEN DO;

/*  The current record is the owner of the set.  */

/*  IF SET (SET_NAME2) EMPTY THEN -------   */
      CALL IDMS(SUBSCHEMA_CTRL, IDBMSCOM(64), SET_NAME2);
      IF ERROR_STATUS = '0000'
      THEN DO;
           CALL NOPPROC;
           END;
      ELSE DO;

/* Subject record was owner and the set was not empty.  */

CALL FPROC;
         /*  FIND/OBTAIN FIRST SET (SET_NAME2)  */
         IF OBTAIN_INDICATOR
         THEN CALL IDMS(SUBSCHEMA_CTRL, IDBMSCOM(20), SET_NAME2,
              IDBMSCOM(43));
         ELSE CALL IDMS(SUBSCHEMA_CTRL, IDBMSCOM(20), SET_NAME2);
         DO WHILE(ERROR_STATUS = ¬'0000' & CONTINUE);

/*  Save current position in set.  */

PRIOR_REF = CURRENT_REF;
            CURRENT_REF = DBKEY;
            CONTINUE = PFUNCT;

/*  Restablish current position in set, if lost.  */

IF DBKEY ¬= CURRENT_REF
            THEN DO;
                FIND DBKEY (CURRENT_REF);
                IF ERROR_STATUS ¬= '0000'
                THEN DO;
                     FIND DBKEY(PRIOR_REF);
                     IF ERROR_STATUS ¬= '0000'
                     THEN RETURN;
                     ELSE;
                     END;
                ELSE;
                END;
            ELSE;
            CURRENT_REF = DBKEY;
            /*  FIND/OBTAIN NEXT SET (SET_NAME2)  */
            IF OBTAIN_INDICATOR
            THEN CALL IDMS(SUBSCHEMA_CTRL, IDBMSCOM(14), SET_NAME2,
                 IDBMSCOM(43));
            ELSE CALL IDMS(SUBSCHEMA_CTRL, IDBMSCOM(14), SET_NAME2);
            END;
```

```
            /* Restore subject record as current record of program. */

/*  FIND RECORD DBKEY (OWNER_REF)  */
            CALL IDMS(SUBSCHEMA_CTRL, IDBMSCOM(75), OWNER_REF);
            CALL IDMS_STATUS;
            CALL LPROC;
            END;
        RETURN;
        END;
   ELSE;
   /* Subject record is member of the designated set. */

/*  FIND/OBTAIN OWNER SET (SET_NAME2)  */
   IF OBTAIN_INDICATOR
   THEN CALL IDMS(SUBSCHEMA_CTRL, IDBMSCOM(31), SET_NAME2,
        IDBMSCOM(43));
   ELSE CALL IDMS(SUBSCHEMA_CTRL, IDBMSCOM(31), SET_NAME2);
   IF ERROR_STATUS = '0000'
   THEN DO;

/* Subject record is member and connected into set. */

IF PFUNCT
        THEN;
        ELSE;
        /* Restore subject record as current record of program. */

/*  FIND  DBKEY (CURRENT_REF)  */
        CALL IDMS(SUBSCHEMA_CTRL, IDBMSCOM(75), CURRENT_REF);
        CALL IDMS_STATUS;
        END;

/* Determine if record is member but not connected. */

ELSE IF ERROR_STATUS = '0322'
        THEN DO;
            ERROR_STATUS = '0000';
            CALL NOPPROC;
            END;
        ELSE CALL IDMS_STATUS;

END OPRTNRS;

IDMS_STATUS: PROCEDURE;

/* The IDMS_STATUS procedure is called by the user after each
   IDMS command has been issued and checks have been made for any
   expected non-zero ERROR_STATUS condition.  It detects non-zero
   ERROR_STATUS and abnormally terminates the run-unit with an
   error message. */

PUT SKIP EDIT ('PROGRAM NAME ----------------', PROGRAM_NAME,
                  'ERROR STATUS-----------------', ERROR_STATUS,
                  'ERROR RECORD-----------------', ERROR_RECORD,
                  'ERROR SET--------------------', ERROR_SET,
                  'ERROR AREA-------------------', ERROR_AREA,
                  'LAST GOOD RECORD-------------', RECORD_NAME,
                  'LAST GOOD AREA---------------', AREA_NAME)
                  (A(19),X(5),A(8),SKIP,A(19),X(5),A(4),5(SKIP,
                  A(19),X(5),A(16)));
   FINISH
   CALL ABORT,
   END IDMS_STATUS;
```

What is claimed:

1. A data base management system for controlling storage, retrieval and modification of information in a data collection contained in storage devices in a data processing system, said data collection consisting of a plurality of data records, each data record including zero, one or more items, each item being representative of zero, one or more data values, comprising:
   A. means for establishing in said data processing system one or more partnership sets within at least one data record, each of said partnership sets being representative of zero, one or more partnerships,
   B. means for establishing in said data processing system one or more of said partnerships, wherein each of said partnerships is characterized by one partnership set associated with itself or associated with one other partnership set,
   C. means for accessing in said data processing system one or more data records by reference to a partnership set which is in partnership with partnership sets of said one or more data records.

2. A database management system according to claim 1, further comprising means for selectively dis-establishing in said data processing system one or more of said partnerships.

3. A database management system according to claim 1 further comprising means for selectively adding in said data processing system information to said data collection.

4. A database management system according to claim 1 wherein said partnership establishing means establishes said partnerships whereby each partnership uniquely associates a pair of partnership sets.

5. A database management system according to claim 1 wherein said partnership establishing means establishes said partnerships whereby each association between two partnerships is non-directed.

6. A data base management method for controlling storage, retrieval and modification of information in a data collection contained in storage devices in a data processing system, said data collection consisting of a plurality of data records, each data record including zero, one or more items, each item being representative of zero, one or more data values, said method comprising steps of:
   A. said data processing system establishing one or more partnership sets within at least one data record, each of said partnership sets being representative of zero, one or more partnerships,
   B. said data processing system establishing one or more of said partnerships, wherein each of said partnerships is characterized by one partnership set associated with itself or associated with one other partnership set, and
   C. said data processing system accessing one or more data records by reference to a partnership set which is in partnership with partnership sets of said one or more data records.

7. The method according to claim 6, comprising the further step of said data processing system selectively dis-establishing one or more of said partnerships.

8. The method according to claim 6 comprising further the step of said data processing system selectively adding information to said data collection.

9. The method according to claim 6 wherein said partnership establishing step establishes said partnerships whereby each partnership uniquely associates a pair of partnership sets.

10. The method according to claim 6 wherein said partnership establishing step establishes said partnerships whereby each association between two partnership sets is non-directed.

* * * * *